(12) United States Patent
Oblizajek

(10) Patent No.: US 11,422,067 B2
(45) Date of Patent: Aug. 23, 2022

(54) METHOD AND SYSTEM FOR QUANTIFYING DYNAMIC RESPONSE CHARACTERISTICS OF A REAL-TIME DAMPER

(71) Applicant: GM GLOBAL TECHNOLOGY OPERATIONS LLC, Detroit, MI (US)

(72) Inventor: Kenneth L. Oblizajek, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 619 days.

(21) Appl. No.: 16/524,379

(22) Filed: Jul. 29, 2019

(65) Prior Publication Data
US 2021/0033494 A1    Feb. 4, 2021

(51) Int. Cl.
| | | |
|---|---|---|
| G01M 17/04 | (2006.01) | |
| B60G 17/08 | (2006.01) | |
| F16F 9/53 | (2006.01) | |
| B60G 13/08 | (2006.01) | |

(52) U.S. Cl.
CPC ............. *G01M 17/04* (2013.01); *B60G 13/08* (2013.01); *B60G 17/08* (2013.01); *F16F 9/532* (2013.01); *F16F 9/535* (2013.01); *B60G 2202/24* (2013.01); *B60G 2500/10* (2013.01); *B60G 2600/182* (2013.01); *B60G 2800/162* (2013.01); *F16F 2222/06* (2013.01); *F16F 2228/066* (2013.01); *F16F 2230/0017* (2013.01)

(58) Field of Classification Search
CPC ........ B60G 13/08; B60G 15/08; B60G 17/08; G01M 17/04; F16F 9/532; F16F 9/535; F16F 15/0275

USPC ...................... 73/11.04, 11.07–11.09; 701/37
See application file for complete search history.

(56) References Cited

U.S. PATENT DOCUMENTS

| | | | | |
|---|---|---|---|---|
| 5,259,246 A | * | 11/1993 | Stuyts ................... | G01M 17/04 73/669 |
| 5,665,901 A | * | 9/1997 | Ilzig ....................... | G01M 17/04 73/11.08 |

(Continued)

FOREIGN PATENT DOCUMENTS

| | | | | | |
|---|---|---|---|---|---|
| CN | 201819809 U | * | 5/2011 | ............ | G01M 17/04 |
| CN | 206601223 U | * | 10/2017 | ............ | G01M 17/02 |

(Continued)

*Primary Examiner* — Christopher P Schwartz
(74) *Attorney, Agent, or Firm* — Quinn IP Law

(57) ABSTRACT

A method for quantifying dynamic response characteristics of a real-time damper includes positioning the damper between a stationary member and a moveable member of a shock press having a force transducer, and transmitting motion control signals to the shock press, via a test controller, to stroke the moveable member and cause the damper to move with a constant velocity between extremes of stroke. A test drive signal is transmitted to the damper for a calibrated test duration. The test drive signal has a calibrated discrete frequency, frequencies, or a frequency sweep range. The method includes measuring, via the force transducer, a force component of the damper while transmitting the test drive signal, and quantifying the response characteristics of the damper over the test duration, including recording the response characteristics in a memory device. A test system includes a shock press, force transducer, and test controller.

20 Claims, 5 Drawing Sheets

(56) References Cited

U.S. PATENT DOCUMENTS

| | | | |
|---|---|---|---|
| 2009/0171532 A1* | 7/2009 | Ryan | G01M 17/04 |
| | | | 701/37 |
| 2011/0202236 A1* | 8/2011 | Galasso | B62K 25/04 |
| | | | 701/37 |
| 2022/0118812 A1* | 4/2022 | Liu | B60G 17/06 |

FOREIGN PATENT DOCUMENTS

| | | | | |
|---|---|---|---|---|
| CN | 108692956 A | * | 10/2018 | G01M 17/007 |
| DE | 4439997 C1 | * | 6/1996 | B60G 15/08 |
| FR | 3051909 A1 | * | 12/2017 | G01M 17/04 |

* cited by examiner

METHOD AND SYSTEM FOR QUANTIFYING DYNAMIC RESPONSE CHARACTERISTICS OF A REAL-TIME DAMPER

INTRODUCTION

The present disclosure relates to methods and systems for quantifying dynamic response characteristics of controlled dampers, which are also referred to in the art as "real-time" dampers. Real-time dampers are typically used to minimize vibration in motor vehicles and other rolling platforms having sprung and unsprung masses, control low-frequency motions of the vehicle during steering maneuvers, and maintain contact of the vehicle's tires with a road surface.

The sprung mass of a rolling platform, the latter of which is exemplified herein as a vehicle chassis, generally encompasses a frame and a body, or alternatively a unibody construction in which the frame and body are integrally formed. A suspension system connects the sprung mass to the vehicle's drive axles and road wheels, with suspension system components, drive axles, and road wheels collectively forming the unsprung mass. As a vehicle travels along a road surface, tires disposed on the various road wheels will periodically contact bumps, cracks, potholes, and other surface imperfections. Coil springs and corner dampers of the suspension system collectively absorb energy resulting from such contact. Together, the springs and dampers minimize the transfer of vibration energy into the vehicle chassis to improve ride comfort.

Real-time dampers are a particular type of passive damping device having sliding damper rods disposed within an outer damper housing. The damper rods accommodate vertical motion in a different manner than coil springs, which compress and extend for storing/returning energy responsive to changing forces. Typically, the damper rods translate in a telescoping manner within the damper housing. Unlike actively-controlled dampers ("active dampers") employing powered actuators that can input energy, a real-time damper instead dissipates energy. Energy dissipation is achieved by changing the sliding resistance presented to the translating damper rods located within the damper housing. Such a change may be initiated by transmission of an electric drive signal to the real-time damper.

SUMMARY

A method is disclosed herein for quantifying dynamic response characteristics of a controlled/real-time damper. As noted above, such dampers are often used as part of sprung mass systems such as motor vehicles, robots, or similar rolling platforms having a suspension system connecting a sprung mass to a set of road wheels. Tires are mounted to the road wheels, with each of the tires in rolling contact with a road surface. In order for a damper rod of a real-time damper to begin to slide with small displacements within a damper cylinder, the damper rod is first required to overcome frictional forces between the damper rod and internal seals of the damper cylinder.

As the damper rod initiates relative motion along the damper cylinder, stiction properties define the resisting forces and influence the related damper rod motion. Due to the resulting friction and stiction properties, the damper rods tend to intermittently and partially cease or bind within the damper housing. Friction and stiction collectively produce force contributions that depart from those of an "ideal" damper, with an ideal damper producing forces exclusively through internal fluid flow-dependent relationships. As the magnitude of the damper rod displacements increase, the flow relationships will dominate. However, noise, vibration, and harshness effects occurring at small displacements can be perceived by an operator or passenger of the vehicle. Such undesirable effects may be exacerbated under certain operating conditions.

Favorably influencing various mechanical responses in a vehicle over the duration of usage of a real-time damper, when achieved use of control algorithms that ultimately result in drive commands to the real-time damper, demands accurate quantification of the dynamic response characteristics of the damper. Such algorithms seek to establish: [1] the usable bandwidth of frequencies under representative amounts of displacement, and [2] requirements for in-vehicle control compensation to remedy, overcome, or ameliorate bandwidth deficiencies. Thus, it would be advantageous to be able to accurately quantify the dynamic response characteristics of a given real-time damper under a range of possible drive signals, doing so for particular representative mechanical motions or velocities of the damper.

The present approach provides such a solution. In particular, the disclosed method employs a shock press setup to impose a cyclic constant velocity on a real-time damper, and then varies an electrical drive signal ("test drive signal") to the real-time damper, e.g., a current signal or other suitable drive signal that energizes coils, windings, or another drive mechanism of the real-time damper to thereby alter damping forces. For instance, the test drive signal may be a sine wave that is varied in real-time, with the dynamic response characteristics detected at a given test frequency, dwell points at selected frequencies, or a swept range of test frequencies. The response of the real-time damper under test may be quantified in this manner for multiple velocities and test drive signals as set forth herein.

By way of an illustrative example, the maximum amplitude of a sinusoidal test drive signal may be held fixed. A relatively high-frequency component may be injected into the test drive signal and varied with time, e.g., over a two-second or four-second test interval. As real-time dampers are generally used to improve primary ride motion of a vehicle chassis, such as sub-1 Hz vertical motion, and for damping certain ranges of motion of the unsprung mass/suspension, typically less than 20 Hz, the term "high-frequency" as used herein may be less than 100-200 Hz, e.g., 10-20 Hz for typical road vibration, with "low-frequency" referring to frequencies of less than 5 Hz. Different frequencies may be used in other embodiments and applications. Controlling low-frequency body motion and also suppressing high-frequency vibrations in the vicinity of vehicle occupants requires careful tuning or calibration of the damper.

To facilitate such control, the present approach automatically simulates and quantifies dynamic response characteristics of a real-time damper prior to introducing the real-time damper into a suspension system. The present approach may also be used to facilitate diagnostics. For instance, a particular problematic vibration frequency or range thereof may develop in a rolling platform, with dynamic response quantification according to the present approach enabling optimal tuning of the real-time damper to attenuate such vibrations. Additional uses for the quantified response characteristics include incorporation of salient quantifiable constitutive relationships in simulations of full vehicle models or subsystems thereof, in either fully mathematical or hybrid configurations of mathematical and hardware origins, which are commonly termed hardware-in-the-loop or software-in-the loop evaluations.

An exemplary embodiment of the present method includes positioning the real-time damper between a stationary member and a moveable member of a shock press, with the stationary member having a force transducer coupled thereto. The method also includes transmitting motion control signals to the shock press, via a test controller, to thereby stroke the moveable member and the real-time damper with a constant velocity between consecutive extremes of stroke. A test drive signal is then transmitted to the real-time damper for a calibrated test duration. The test drive signal in this exemplary embodiment may have a calibrated discrete/single frequency, multiple discrete "dwell point" frequencies, or a frequency sweep range in different embodiments.

The method also includes measuring, via the force transducer, a force component along a longitudinal axis of the real-time damper while transmitting the test drive signal. The dynamic response characteristics of the real-time damper are then quantified over the calibrated test duration, including recording the dynamic response characteristics as response data in a memory device, e.g., of the test controller or another computer device, and optionally fitting the response data to amenable formulations suitable for parametric reductions of constitutive relationships.

The real-time damper may be optionally embodied as a magnetorheological ("MR") damper or as an electrorheological ("ER") damper. In such optional embodiments, transmitting the test drive signal includes energizing the MR damper or the ER damper to thereby alter a magnetic field or an electric field of the MR or ER damper, respectively.

In a non-limiting embodiment, transmitting the test drive signal to the real-time damper includes implementing the above-noted frequency sweep range over the calibrated test duration, e.g., 1 Hz to 200 Hz.

Quantifying the dynamic response characteristics of the real-time damper may also include calculating a frequency response function ("FRF") of the real-time damper. For instance, calculating the FRF may include dividing the calibrated test duration into a plurality of time windows within the calibrated test duration, applying a fast Fourier transform ("FFT") at each of the time windows to generate transformed force and test drive signals, and then generating ratios of the transformed force to the transformed test drive signals as the response data.

Quantifying the dynamic response characteristics of the real-time damper may also include performing parameter reduction, and possibly generating a plot of at least one real pole and at least one complex or imaginary pole.

In some embodiments, the test drive signal may be rectified prior to transmitting the test drive signal to the real-time damper. In other embodiments, the test drive signal may be analytically rectified prior to performing the FFT on the test drive signal. The latter embodiment may be used to simulate an expected magnetic or electric field achieved in some damper configurations.

Transmitting the motion control signals to the shock press may optionally include transmitting a square wave velocity drive signal to the shock press.

A test system is also disclosed herein for quantifying dynamic response characteristics of a real-time damper. In a possible embodiment, the test system includes a shock press having a stationary member and a moveable member. The shock press is configured to receive the real-time damper between the stationary member and the moveable member. The test system includes a force transducer, which may be coupled to the stationary member. The force transducer is configured to measure a force component along a longitudinal axis of the real-time damper. A test controller is configured to execute the above method.

That is, the test controller transmits motion control signals to the shock press to thereby stroke the moveable member and the real-time damper with a constant velocity between consecutive extremes of stroke, and also transmits a test drive signal to the real-time damper for a calibrated test duration. As noted above, the test drive signal has a calibrated frequency, which is variously embodied as one or more discrete frequencies or dwell points of selected frequencies, or as a frequency sweep range as noted above. The test controller receives the force component measured by the force transducer while transmitting the test drive signal to the real-time damper. Ultimately, the test controller or a subsequent post-processing device may be used to quantify the dynamic response characteristics of the real-time damper over the calibrated test duration, including recording the dynamic response characteristics in a memory device.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
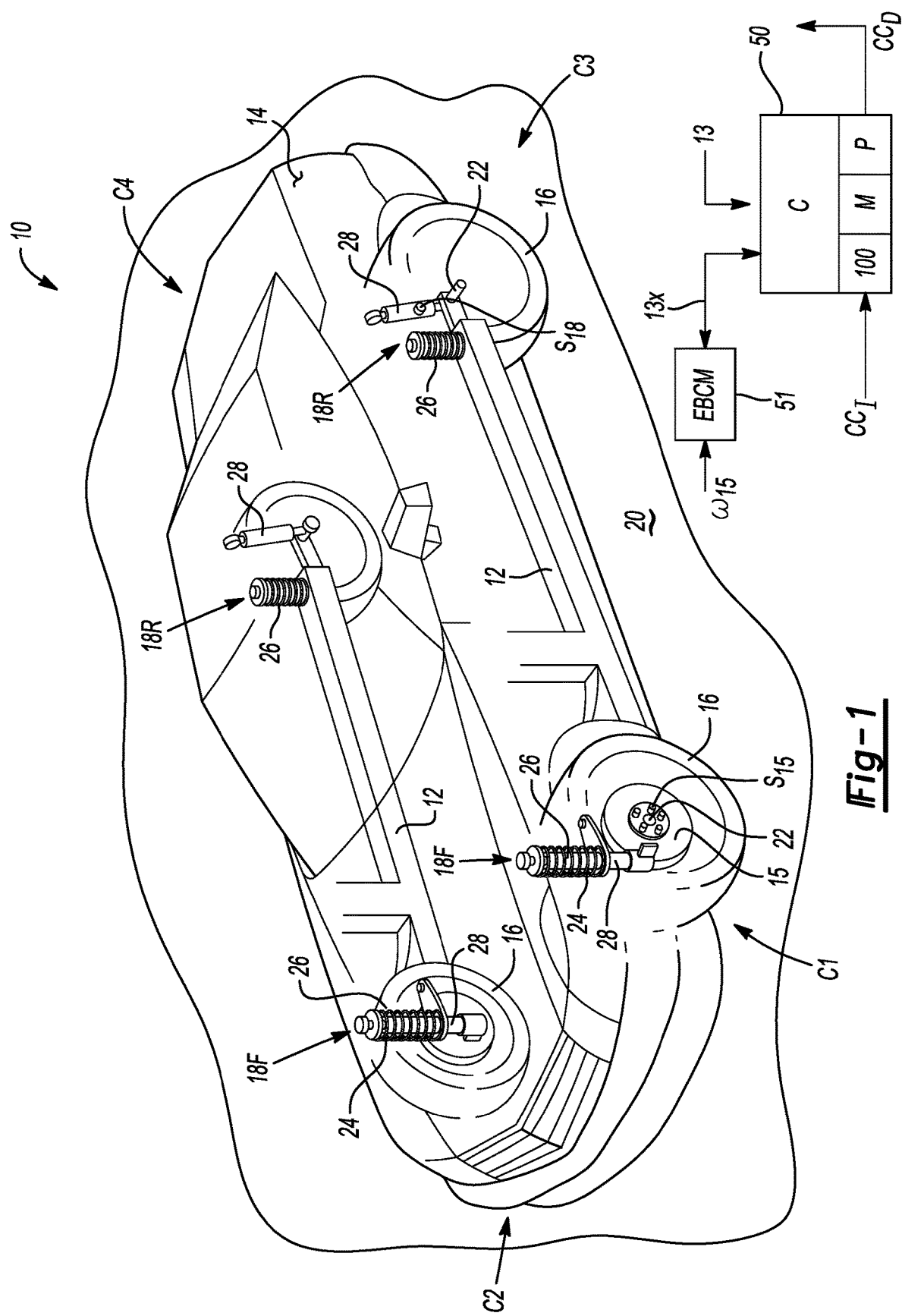
FIG. 1 is a schematic illustration of a motor vehicle with controlled/real-time dampers whose dynamic response characteristics are quantified in accordance with the present disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a sprung mass system is depicted schematically in FIG. 1 as a rolling platform 10 having front and rear suspension systems 18F and 18R, respectively. The front and/or rear suspension systems 18F and 18R include a real-time damper 28 whose structure, performance, and dynamic response are described in further detail below. While depicted as a motor vehicle, other embodiments may be envisioned within the scope of the disclosure, including but not limited to robots, mobile platforms, construction equipment, or other systems having a sprung mass connected to or "sprung" to a set of road wheels 15 via the suspension systems 18F and 18R. For simplicity, the rolling platform 10 will be referred to hereinafter as the motor vehicle 10 without limitation.

A goal of a properly designed suspension system, such as the suspension systems 18F and 18R, is to minimize excitation forces ultimately transmitted to the sprung mass while simultaneously achieving other performance needs of motion control and tire/road contact. Controlled dampers are responsive to electronic drive signals, as noted above. In order to understand the bandwidth of a controlled damper, one attempts to determine the equivalent dynamic response characteristics of the damper. Implementations for doing this, lacking or using approximate characterizations, offer suboptimal responses. The present method 100 is therefore directed toward accurately quantifying the dynamic response characteristics of the real-time dampers 28, and possibly using the quantified response characteristics to optimize control of the front and rear suspension systems 18F and 18R using the real-time damper 28. Such a method 100 is described below with reference to FIGS. 2-5C.

With respect to the sprung mass of FIG. 1 in particular, the motor vehicle 10 includes a chassis having frame ("chassis frame") 12, a vehicle body 14, and the road wheels 15. Each of the road wheels 15 includes a tire 16 that remains in rolling contact with a road surface 20. The chassis frame 12 and the vehicle body 14 may be separate components as shown, or they may be integrally formed as a unibody construction. The chassis frame 12 has four corners C1, C2, C3, and C4, with the corners C1, C2, C3, and C4 corresponding to the locations of the road wheels 15 located at the front left, front right, rear left, and rear right of the chassis frame 12, respectively. Other configurations may have a different number of corners, e.g., a three-wheeled vehicle, and therefore the four-corner configuration is illustrative of the present teachings and non-limiting.

The chassis frame 12 and the vehicle body 14 are sprung to the road wheels 15 disposed at corners C1 and C2 by the front suspension systems 18F, and to the road wheels 15 disposed at corners C3 and C4 by the rear suspension systems 18R. The road wheels 15 are attached to suspension systems 18F and 18R via axles 22. The front suspension systems 18F may include a strut 24, e.g., a MacPherson strut, having a coil spring 26 and a real-time damper 28 that cooperate with each other to control vertical motion of the motor vehicle 10 and the axles 22, and to help improve overall ride comfort for passengers of the motor vehicle 10. The rear suspension systems 18R may also include a coil spring 26 as a shock component, and the above-noted real-time damper 28, shown as separate members in FIG. 1.

Alternatively, the front suspensions 18F may include separate coil springs and dampers, e.g., in short-long arm ("SLA") suspensions. Likewise, alternative rear suspensions 18R include integral coil spring and dampers configured as coil-over modules. Additional alternative spring members can vary, for instance as leaf springs, torsion-bars, etc. As shown in FIG. 1, the springs 26 and real-time dampers 28 form a parallel configuration characterized by vehicular body forces resulting from the sum of the respective spring and damper forces. The coil springs 26 will tend to compress and extend in response to vertical forces to permit movement of the road wheels 15 relative to the sprung mass, i.e., the chassis frame 12 and the vehicle body 14.

As noted above, the real-time dampers 28 are a particular type of passive damper that have the ability to continuously and virtually instantaneously ("real-time") change the flow resistance as the fluid passes from one chamber to another inside the real-time damper 28. To that end, a control unit (C) 50 may receive real-time measurements from rotary sensors ($S_{15}$), e.g., wheel speed sensors disposed on the individual road wheels 15 (omitted from the rear road wheels 15 for simplicity) and motion sensors ($S_{18}$) such as displacement sensors or accelerometers disposed on the unsprung mass, i.e., the real-time dampers 28 and/or other portions of the suspension systems 18F and 18R.

The control unit 50 may also receive signals from other systems in the vehicle 10, including but not limited to steering wheel angle, brake pedal position and accelerator pedal position, etc. A secondary control unit 51, e.g., an electronic brake control module ("EBCM") in an example embodiment, may be in communication with the control unit 50 over a controller area network bus or another communications link via signals (arrow 13x) to provide parameters or data enabling calculation of values in the course of the present method 100, including wheel speeds (arrow $\omega_{15}$), thus enabling identification of transient and/or sustained vibrations at periodic frequencies over intervals of time adequate for a possible bandwidth of interest.

Operation of the real-time dampers 28 may be regulated by the control unit 50 in response to input signals (arrow $CC_I$), including readings from the sensors ($S_{15}$) and ($S_{18}$), and a possible manually-generated or automatically-generated override signal (arrow 13). An electric drive signal (arrow $CC_D$), possibly in a time-varying form as described below, is transmitted by the control unit 50 to each of the dampers 28, individually, over a two-wire conductor. That is, forces of the real-time dampers 28 may be individually modified by the control unit 50 as part of method 100, with descriptions herein applicable to a given real-time damper 28 being applicable to the remaining real-time dampers 28, albeit with possible variation in the corresponding damping control of the real-time dampers 28 at the corners C1, C2, C3, and C4.

The real-time dampers 28 whose performance is ultimately quantified according to the present method 100 may be variously embodied as field-controlled magnetorheological ("MR") or electrorheological ("ER") devices, or dynamically valve-controlled dampers. As will be appreciated, an MR damper includes ferrous particles suspended in an oil base fluid, which enables a continuously variable flow restriction to occur in the presence of a continuously-varying magnetic field. ER dampers operate in a similar manner using a suspension of dielectric particles in a non-conducting base fluid, and with the applied field being an electric field. Damping in a real-time MR or ER damper is largely a matter of timing the field generation and scaling the field. Other embodiments of the real-time damper 28 exist, e.g., valve-based real-time hydraulic dampers as noted above, having the ability to vary the forces by controlling valve flow resistance responsive to input signals. The present teachings therefore extend to the various types of real-time damper 28.

The control unit 50 may include one or more processors (P) and tangible non-transitory memory (M), including read only memory in the form of optical, magnetic, or flash memory. Although omitted from FIG. 1 for illustrative clarity, the motor vehicle 10 is equipped with a power bus and/or an auxiliary power module in communication with the control unit 50, or integral thereto, such that transmission of the electric drive signal (arrow $CC_D$) is a straightforward matter of connecting drive coils or other drive circuity of the real-time dampers 28 to such a power bus or output of such an auxiliary power module. The control unit 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

Figure 2:
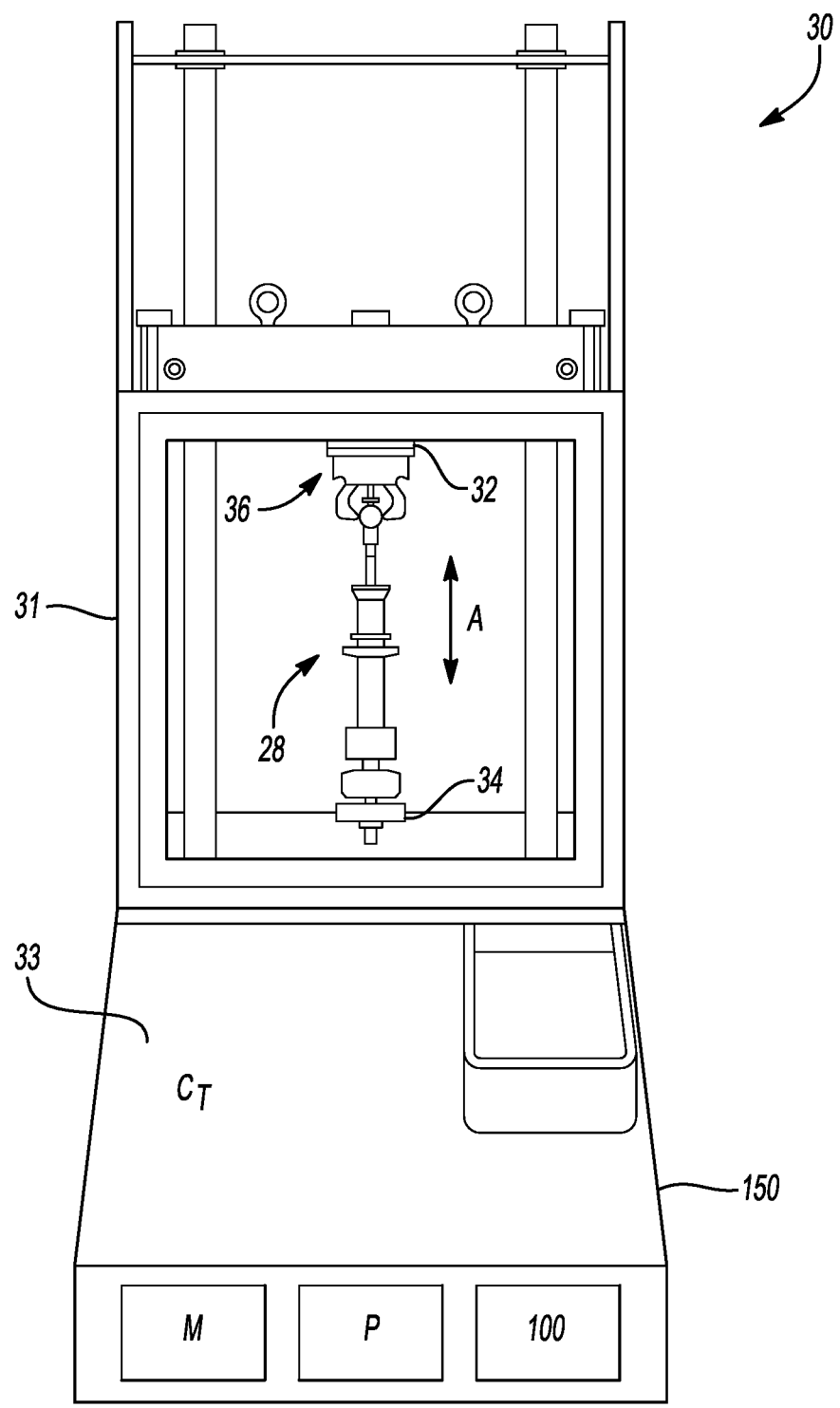
FIG. 2 is a schematic illustration of an exemplary test setup that may be used to quantify the dynamic response characteristics of a real-time damper of the type used aboard the motor vehicle of FIG. 1 or another rolling platform.

Referring to FIG. 2, the method 100 described herein may be implemented in conjunction with an exemplary test setup 30 having a shock press 31. As will be appreciated by those of ordinary skill in the art, the shock press 31 is typically constructed as a hydraulically-actuated machine having a stationary member 32 disposed opposite a moveable member 34. A test controller ($C_T$) 150, which may be optionally housed within a cabinet 33 in proximity to the shock press 31 as shown and configured as one or more computer having memory (M) and a processor (P) or core, controls stroke and vertical motion of the moveable member 34 to thereby implement a desired set of test parameters. The moveable member 34 responds to the motion control commands from the test controller 150 by moving up or down as indicated by double-headed arrow A.

The present method 100 includes positioning the real-time damper 28 in the shock press 31 between the stationary member 32 and the moveable member 34, with commanded motion of the moveable member 34 alternatively compressing and extending the real-time damper 28. A force transducer 36, which may be optionally coupled to the stationary member 32, is used to measure forces transmitted along a longitudinal axis of the real-time damper 28, and to report the measured forces to the test controller 150. Placement of the force transducer 36 at or on the stationary member 32 advantageously avoids certain interferences, such as inertial transducer reactions during induced relative motion of ends of the real-time damper 28.

Figure 3:
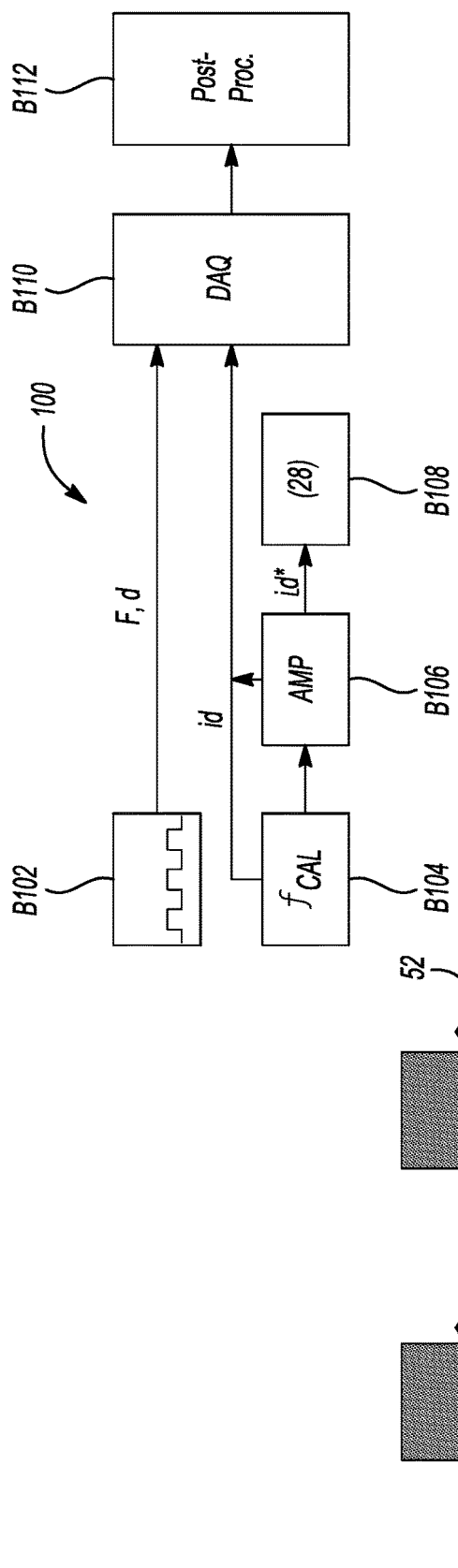
FIG. 3 is a flow diagram for a method of quantifying the dynamic response characteristics of a real-time damper.

The method 100 may be best understood with reference to FIGS. 2 and 3. The method 100 commences with block B102 of FIG. 3 once the real-time damper 28 is securely positioned between the stationary member 32 and the moveable member 34 of the shock press 31. As part of block B102, the test controller 150 transmits motion control signals to the shock press 31 to cause the moveable member 34 to move in a cyclical manner with a calibrated stroke, exemplified as trace 52 ("d") in FIG. 3. The velocity of the moveable member 34 in alternating opposing stroke directions is thus held constant between consecutive extremes of stroke, through the calibrated test duration, with an exemplary velocity control signal depicted as trace 54 ("Vel") of FIG. 4, e.g., a square wave velocity drive signal.

Figure 4:
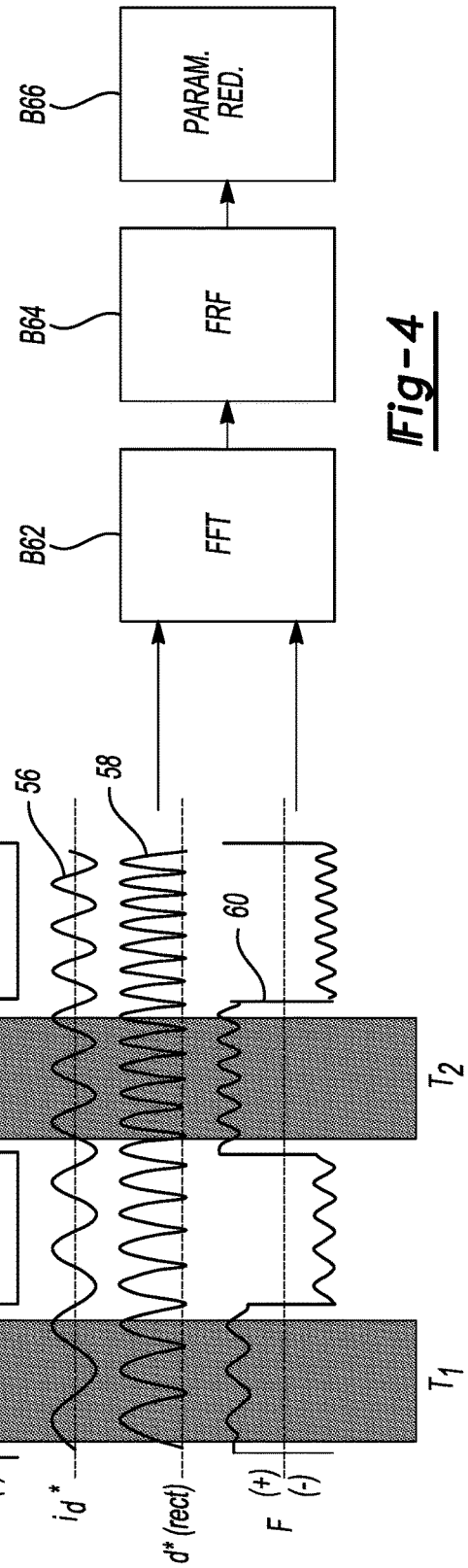
FIG. 4 is a hybrid set of time plots and logic blocks describing quantification of the dynamic response characteristics of the real-time damper using the method of FIG. 3.

Additionally, the force transducer 36 disposed at or near the top of the shock press 31 measures and reports force components of the real-time damper 28 under test, with an example force trace 60 ("F") depicted in FIG. 4. The force and stroke data (arrow F, d of FIG. 3) are fed to the test controller 150, as represented by a data acquisition block B110. Due to the reciprocating motion of the real-time damper 28 under test, the various quantities in FIG. 4 have positive (+) and negative (−) amplitudes, as will be appreciated by those of ordinary skill in the art.

Concurrently with block B102, the method 100 uses block B104 to transmit a test drive signal ($i_d$) to the real-time damper 28 under test. This may occur at a calibrated frequency ("$f_{CAL}$"), e.g., a particular single/discrete frequency, or at multiple different test frequencies each over fixed time intervals. Alternatively, block B104 may be conducted across a swept frequency range over an interval of the test. For instance, an illustrative application of block B104 may entail implementing a slow sweep of the 1-200 Hz frequency range, or a portion thereof, which may occur every few seconds or over a longer duration. The test drive signal may be amplified ("AMP") or otherwise transformed at block B106, such as by using a linear power amplifier with current feedback, with the amplified test drive signal ($i_d^*$) then delivered to the real-time damper 28 under test at block B108.

Block B108 of FIG. 3 may include transmitting the test drive signal to a drive of the real-time damper 28, e.g., to a coil or windings thereof, to change a magnetic or electric field of the real-time damper 28 when embodied as an MR or ER damper of the type described generally above. In this manner, the test controller 150 is able to alter mechanical impedance of the real-time damper 28. Traces 56 and 58 of FIG. 4 depict respective unrectified and rectified coil drive currents for a non-limiting MR embodiment of the real-time damper 28, with trace 58 described below.

Figure 5A:
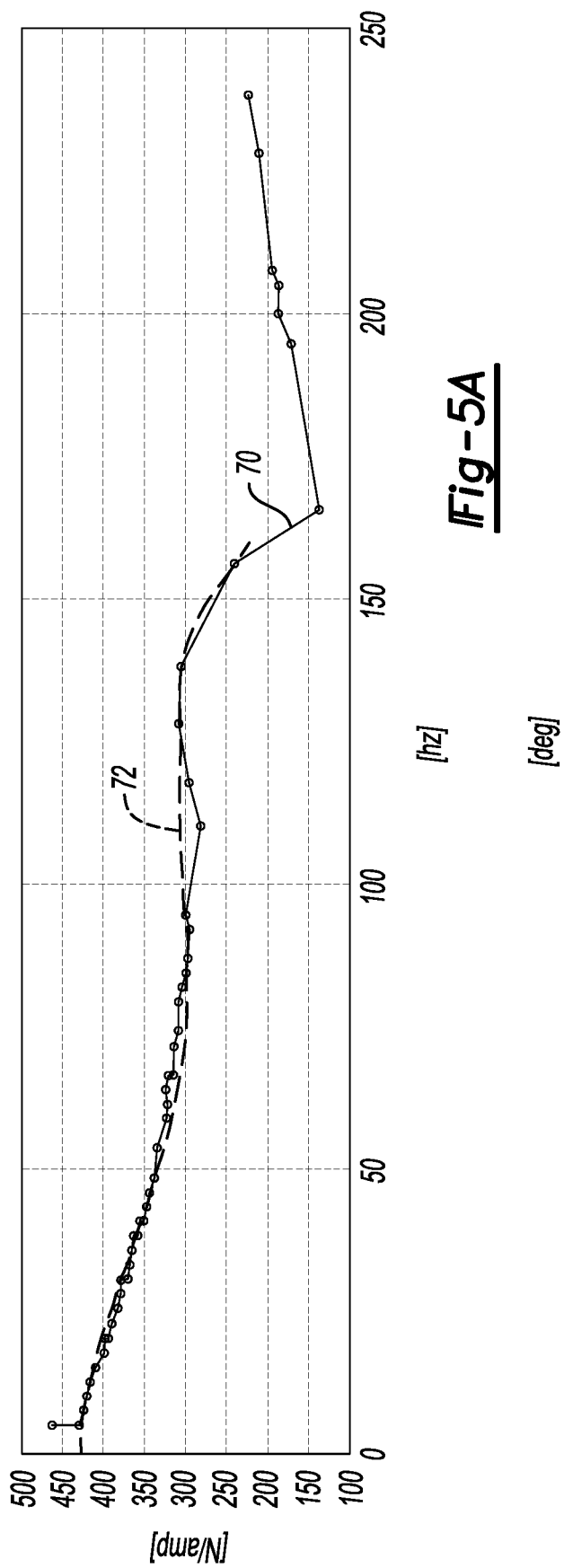
FIG. 5A is a plot of force per unit current (vertical axis) versus frequency (horizontal axis) depicting a representative response characteristic of a real-time damper, commonly referred to as a plot of the "gain factor".
Figure 5B:
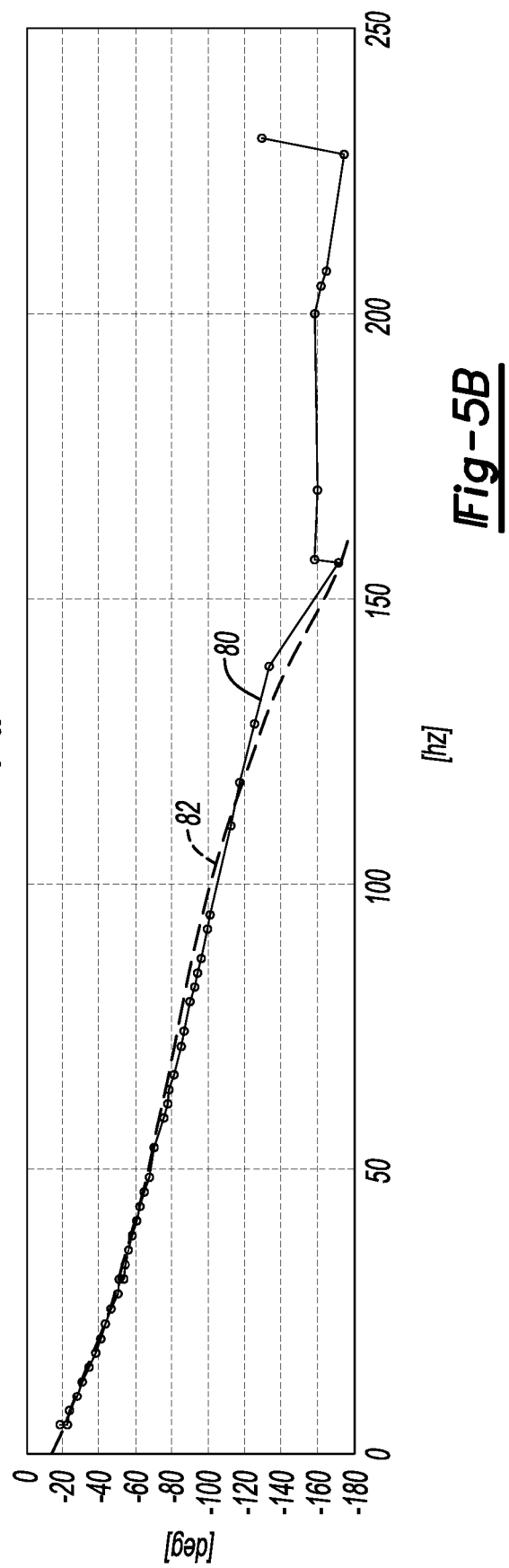
FIG. 5B is a plot of phase (vertical axis) versus frequency (horizontal axis) depicting another representative response characteristic of the real-time damper whose response is depicted in FIG. 5A, with the plot of FIG. 5B commonly referred to as a plot of the "phase factor".
Figure 5C:
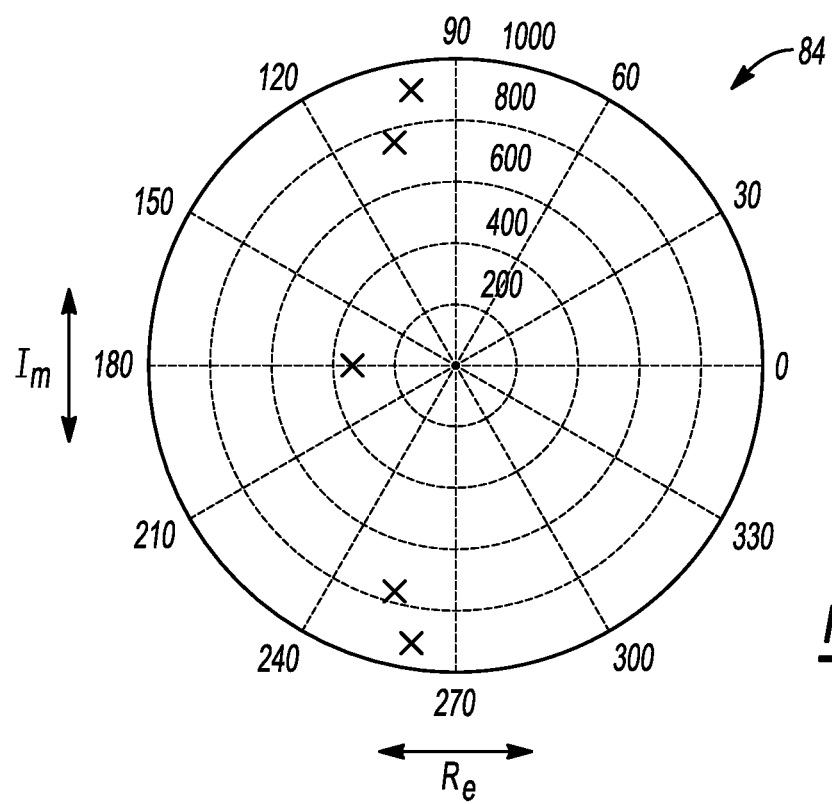
FIG. 5C is a polar plot of real and complex poles showing an alternative way to characterize the response of a real-time damper according to the present method.

The corresponding information describing the frequency range and amplitude of the test drive signal, both as requested by the test controller 150 and as actually achieved, are fed to the data acquisition ("DAQ") block B110 of FIG. 3. Once data collectively describing the test inputs and frequency-specific response of the real-time damper 28 has been collected for the duration of the test, a post-processing ("Post-Proc.") block B112 may be used to compile test results. Such test results, an illustrative example of which is shown in FIGS. 5A-5C, may be recorded as part of method 100 in a memory device, e.g., the memory (M) of the test controller 150 or another computer device, and collectively quantify the damping performance of the real-time damper 28 to a range of test inputs. The quantified response may be used to better understand and tune performance of the real-time damper 28 to an optimal level. For instance, the dynamic response characteristics determined by the test controller 150 may be used by the control unit 50 of FIG. 1 to determine how to vary mechanical impedance or forces of the real-time damper 28 in real-time during operation of the motor vehicle 10.

Also shown in FIG. 4 are blocks B62, B64, and B66 describing an additional aspect to implementation of the method 100. As part of the present method 100, the test controller 150 of FIG. 2 may optionally apply fast-Fourier transformation ("FFT") to each of the extracted time windows of data, e.g., windows $T_1$ and $T_2$ of FIG. 4, to generate a transformed force and a transformed test signal, and may form ratios of the transformed force vs. transformed test signals as a Frequency Response Function ("FRF"), i.e., a frequency response, such as at two times ("2×") the drive frequency as indicated by the above-noted rectified trace 58.

At block B66, the test controller 150 may thereafter perform parameter reduction ("PARAM. RED.") to generate the required characterization, e.g., by using parameter reduction/fitting to generate a polar plot of at least one real pole and at least one complex pole.

An exemplary characterization of a real-time damper 28 is depicted in FIGS. 5A-5C. FIG. 5A is a plot of the amplitude of a force per unit current (vertical axis) versus frequency (horizontal axis) depicting a representative performance characterization of the real-time damper 28. This plot is commonly referred to as the plot of "gain factor". Trace 70 depicts the raw data. Trace 72 depicts fitted data. Similarly, FIG. 5B depicts phase (vertical axis) versus frequency (horizontal axis) as another representative performance characterization of the same real-time damper 28. The plot of FIG. 5B is commonly referred to as the plot of "phase factor." Traces 80 and 82 likewise depict respective raw and fitted data. FIG. 5C depicts a polar plot 84 of real ("$R_e$") and complex/imaginary ("$I_m$") poles as a way of condensing the information in FIGS. 5A and 5B, and thus is another possible way to quantify the damper performance of the real-time damper 28.

With respect to FIGS. 5A and 5B, the illustrated response at relatively low frequencies, i.e., between 0 Hz and 50 Hz, is somewhat analogous to the RC response of an electrical circuit, as a single pole has only a real component. Parameter fitting may be used to generate the fitted traces 72 and 82. For instance:

$$TF(s) = \left[ \frac{\alpha}{1+Ts} + \frac{\beta_1}{(s^2 + 2\zeta_1\omega_{01}s + \omega_{01}^2)} + \frac{\beta_2}{(s^2 + 2\zeta_2\omega_{02}s + \omega_{02}^2)} \right] e^{-sT_d}$$

where TF(s) is a transfer function, s is the Laplace variable, T is a time constant which determines the real pole, $\zeta_1$ and $\zeta_2$ are the damping ratios for first and second complex poles, $\omega_{01}$ and $\omega_{02}$ are undamped frequencies for the first and second complex poles, in radians per second, $T_d$ is the time delay in seconds, and $\alpha$, $\beta_1$, and $\beta_2$ are coefficients. $T_d$ exists in this example case due entirely to a delay in the synchronized relationship of two digital processing devices during data acquisition, and is not a property of the damper response. $T_d$ could alternatively quantify time delay between the power drive signal at block B106 of FIG. 3 and the low-level drive signal at block B104 when implemented using digital signal processors. Such considerations may be advantageous in quantifying the in-vehicle power amplifier, which could be implemented at block B106.

For the non-limiting exemplary embodiment of FIGS. 5A and 5B, the damping ratios $\zeta_1$ and $\zeta_2$ are 28.3% and 16.7%, respectively, indicating relatively heavily damped responses. Using the example acquired data of traces 70 and 80, reduced to the frequency domain as shown, one can see a reasonable bandwidth in FIG. 5A through approximately 150 Hz. Using the method 100, one could also test under a wide variety of time-variant test conditions, such as various velocities of changes in the test drive signal, and then map out the characterized response. Informed by the classified response determined by the test controller 150 of FIG. 2, by communicating the characteristic response to the control unit 50 of FIG. 1 electronically or via programming of the control unit 50, the control unit 50 may execute real-time control actions, e.g., by commanding a particular drive current to the real-time damper 28. In this manner, the control unit 50 could vary the force response of the real-time damper 28 to ameliorate a vibration condition at a specific frequency or range thereof in an optimized manner.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for quantifying dynamic response characteristics of a real-time damper, the method comprising:
    positioning the real-time damper between a stationary member and a moveable member of a shock press having a force transducer;
    transmitting motion control signals to the shock press, via a test controller, to thereby stroke the moveable member and the real-time damper with a constant velocity between consecutive extremes of stroke;
    transmitting a test drive signal to the real-time damper for a calibrated test duration, via the test controller, wherein the test drive signal has a calibrated test frequency, dwell points at multiple calibrated frequencies, or a swept range of test frequencies;
    measuring, via the force transducer, a force component along a longitudinal axis of the real-time damper while transmitting the test drive signal; and
    quantifying the dynamic response characteristics of the real-time damper over the calibrated test duration, as a quantified dynamic response, including recording the dynamic response characteristics in a memory device.

2. The method of claim 1, wherein the real-time damper is a magnetorheological ("MR") damper or an electrorheological ("ER") damper, and wherein transmitting the test drive signal includes energizing the MR damper or the ER damper to thereby alter a magnetic field or an electric field of the MR damper or the ER damper, respectively.

3. The method of claim 1, including the swept range of test frequencies, wherein transmitting the test drive signal to the real-time damper includes implementing the swept range of test frequencies over the calibrated test duration.

4. The method of claim 1, further comprising:
    communicating the quantified dynamic response to a control unit of a motor vehicle; and
    controlling an impedance or a force component of another real-time damper in real-time aboard the motor vehicle using the quantified dynamic response.

5. The method of claim 1, including the calibrated test frequency, wherein transmitting the periodic test drive signal to the real-time damper occurs solely at the calibrated test frequency over the calibrated test duration.

6. The method of claim 1, wherein quantifying the dynamic response of the real-time damper includes calculating a frequency response function ("FRF") of the real-time damper.

7. The method of claim 6, wherein calculating the FRF of the real-time damper includes dividing the calibrated test duration into a plurality of extracted time windows within the calibrated test duration, applying a fast Fourier transform ("FFT") at each of the time windows to generate a transformed force and a transformed test drive signal, and then generating ratios of the transformed force to the transformed test drive signal as the FRF.

8. The method of claim 1, wherein quantifying the dynamic response characteristics of the real-time damper includes performing parameter reduction to generate a plot of at least one real pole and at least one complex or imaginary pole.

9. The method of claim 1, further comprising rectifying the test drive signal prior to transmitting the test drive signal to the real-time damper.

10. The method of claim 1, wherein transmitting the motion control signals to the shock press includes transmitting a square wave velocity drive signal to the shock press.

11. A test system for quantifying dynamic response characteristics of a real-time damper, the test system comprising:
a shock press having a stationary member and a moveable member, wherein the shock press is configured to receive the real-time damper between the stationary member and the moveable member;
a force transducer coupled to the stationary member and configured to measure a force component along a longitudinal axis of the real-time damper; and
a test controller configured to:
transmit motion control signals to the shock press to thereby stroke the moveable member and the real-time damper with a constant velocity between extremes of stroke;
transmit a test drive signal to the real-time damper for a calibrated test duration, wherein the test drive signal has a calibrated test frequency, dwell points at multiple calibrated frequencies, or a swept range of test frequencies;
receive the force component measured by the force transducer while transmitting the test drive signal; and
quantify the dynamic response characteristics of the real-time damper over the calibrated test duration, including recording the dynamic response characteristics in a memory device.

12. The test system of claim 11, wherein the real-time damper is a magnetorheological ("MR") damper or an electrorheological ("ER") damper, and wherein transmitting the test drive signal includes energizing the MR damper or the ER damper to thereby alter a magnetic field or an electric field of the MR damper or the ER damper, respectively.

13. The test system of claim 12, wherein the test controller is configured to transmit the test drive signal to the real-time damper by implementing the swept range of test frequencies over the calibrated test duration.

14. The test system of claim 13, wherein the swept range of test frequencies is 1 Hz to 200 Hz.

15. The test system of claim 11, wherein the test controller is configured to transmit the test drive signal to the real-time damper solely at the calibrated test frequency over the calibrated test duration.

16. The test system of claim 11, wherein the test controller is configured to characterize the dynamic response of the real-time damper by calculating a frequency response function ("FRF") of the real-time damper.

17. The test system of claim 16, wherein the test controller is configured to calculate the FRF of the real-time damper by dividing the calibrated test duration into a plurality of extracted time windows within the calibrated test duration, applying a fast Fourier transform ("FFT") at each of the time windows to generate transformed forces and transformed test drive signals, and then generating ratios of the transformed forces to transformed test drive signals as the FRF.

18. The test system of claim 11, wherein the test controller is configured to characterize the dynamic response of the real-time damper using parameter reduction to thereby generate a plot of at least one real pole and at least one complex or imaginary pole.

19. The test system of claim 11, wherein the test controller is configured to rectify the test drive signal prior to transmitting the test drive signal to the real-time damper.

20. The test system of claim 11, wherein the test controller is configured to transmit the motion control signals to the shock press as a square wave velocity drive signal.

* * * * *